United States Patent [19]

Casset

[11] 4,133,133
[45] Jan. 9, 1979

[54] REEL HOLDER
[75] Inventor: Jacques G. Casset, Granada, Spain
[73] Assignee: Strateurop S.A., Granada, Spain
[21] Appl. No.: 860,054
[22] Filed: Dec. 13, 1977
[30] Foreign Application Priority Data
Jan. 10, 1977 [FR] France .............................. 77 00540
[51] Int. Cl.² ............................................. A01K 87/06
[52] U.S. Cl. ........................................................ 43/22
[58] Field of Search ............................................ 43/22
[56] References Cited
U.S. PATENT DOCUMENTS
3,512,293  5/1970  Lumbard ................................. 43/22
FOREIGN PATENT DOCUMENTS
1414041  9/1965  France .......................................... 43/22
173055  10/1960  Sweden ........................................ 43/22
825673  12/1959  United Kingdom ........................ 43/22

Primary Examiner—Nicholas P. Godici
Assistant Examiner—J. T. Zatarga
Attorney, Agent, or Firm—Fitzpatrick, Cella, Harper & Scinto

[57] ABSTRACT

A reel holder for fishing rods comprising inner and outer concentric tubular elements for locking the reel holder to a rod and a separate reel-locking mechanism provided on the outer tubular element. Each end of the inner tubular element is slotted and formed with a raised flange. The outer tubular element is slidably positioned between the raised flanges of the inner element and has a threaded end bearing a nut which has one end extending beyond the threaded end. The raised flanges of the inner tubular element, the opposite end of the outer tubular element and the one end of the nut are so contoured that when the reel holder is positioned on a rod and the nut is partially unscrewed, the outer tubular element and nut bear against the raised flanges to cause the opposite ends of the inner tubular element to simultaneously grip the rod.

8 Claims, 2 Drawing Figures

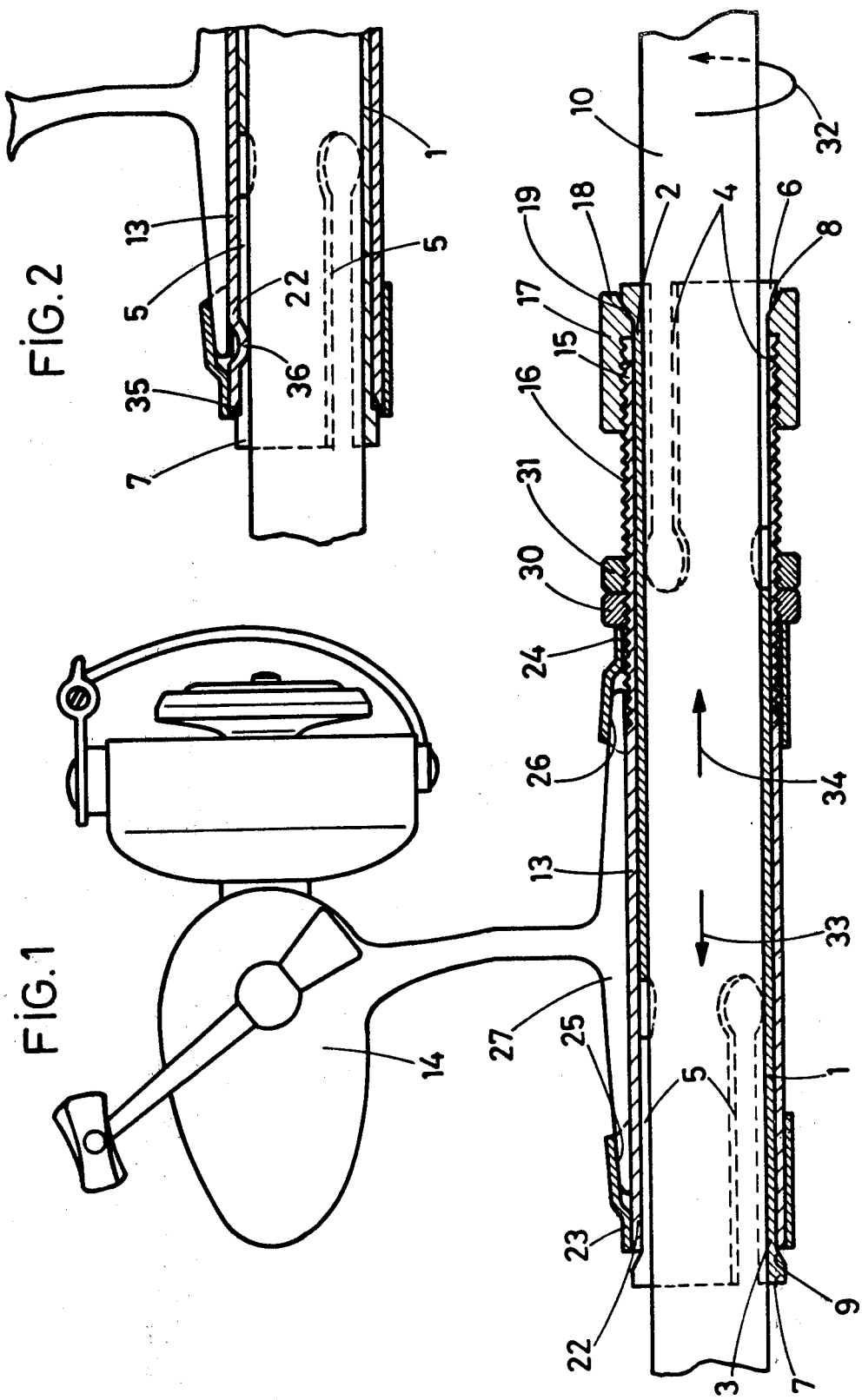

REEL HOLDER

BACKGROUND OF THE INVENTION

1. Field of the Invention

The present invention relates to reel holders for fishing rods and more particularly to reel holders of the type having a tubular element, the position of which is adjustable by sliding same on a rod, means for locking a reel on the holder and separate means for locking the tubular element on the rod.

2. Description of the Prior Art

In known reel holders of this kind, such as the one described in French Pat. No. 1,414,041, each split end of the tubular element is threaded and receives a nut having a tapered inner surface. By screwing each nut, the corresponding tapered inner surface of the nut is displaced so as to tighten the corresponding split end of the tubular element on the rod. In order to fasten the tubular element on the rod it is necessary to successively tighten each of the two nuts in separate tightening steps.

SUMMARY OF THE INVENTION

The present invention avoids the disadvantages of the prior art by making it possible to simplify the fastening of the tubular element on a rod. Specifically the reel holder is so constructed that it can be fastened on a rod in a single step, its two ends being simultaneously tightened to grip the rod. Furthermore the degree of tightening of the two ends of the tubular element are approximately identical.

According to one aspect of the present invention there is provided a reel holder for a fishing rod comprising a first tubular element having at least one lengthwise slot at each end to form two split ends each having a raised annular flange split like the tubular element and a second tubular element supporting means for locking a reel on the reel holder, said second tubular element being slidably mounted around the first tubular element between the raised flanges. A threaded end of the second tubular element bears a nut having an end extendable beyond the threaded end of the second tubular element. The one end of the nut and/or the adjacent raised flange as well as the opposite end of said second tubular element and/or the adjacent raised flange have tapered surfaces so inclined that when the holder is positioned on a rod and the nut is partially unscrewed, the one end of the nut and the opposite end of the second tubular element bear against the raised flanges to simultaneously tighten the split ends of the first tubular element on the rod.

In accordance with another embodiment, the reel holder may also include means to prevent rotation of the reel on the rod. In this embodiment, the second tubular element, which supports the means for locking a reel thereto, includes means for preventing rotation of the second tubular element about the first tubular element. This means consists of a projection integral with the second tubular element shaped to extend into and slide along one of the lengthwise slots in the first tubular element.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

FIG. 1 is a side elevation, partially in section, of a first embodiment of a reel holder according to the present invention; and FIG. 2 is a fragmentary longitudinal cross-section of another embodiment according to the present invention.

DETAILED DESCRIPTION OF THE PREFERRED EMBODIMENTS

As shown in FIG. 1, a reel holder according to the present invention contains a first tubular element 1, the inner dimensions of which are just sufficient to permit it to slide on a rod 10. The two ends 2 and 3 of tubular element 1 each contain, for example, three slots, 4 and 5, respectively, which extend partially lengthwise along tubular element 1 and open out on the corresponding end, 2 and 3, respectively. The two ends 2 and 3 each contain an annular flange, 6 and 7, respectively. Similarly, each flange 6, and 7 has a tapered surface, 8 and 9 respectively, directed inwardly toward the center of tubular element 1. Flanges 6 and 7 and tapered surfaces 8 and 9 are discontinuous at the splits in the tubular element 1.

A second tubular element 13, supporting means for locking a reel 14 on the reel holder, is positioned around the first tubular element 1, between the two flanges 6 and 7. Its first end 15 contains outer threads 16 supporting a nut 17, one end 18 of which extends beyond the first end 15 of tubular element 13. End 18 of nut 17 is recessed to form an inner tapered surface 19 designed to bear against, in mating fashion, tapered surface 8. However, it is also within the scope of this invention to have only one of the two elements 17 or 6 formed with a tapered surface. The second end 22 of the second tubular element 13 is designed to bear against tapered surface 9. In order to position the second tubular element 13 around the first tubular element 1, either element 13 is positioned on element 1 before flanges 7 and 8, and the corresponding tapered surfaces, are formed or else one of the ends 2 and 3 of tubular element 1 is deformed until the end in question will enter the second tubular element 13.

The means for locking reel 14 on the reel holder consist, for example, of two retainer elements 23 and 24. The first retainer element 23 is integral with the outer surface of the second end 22 of the second tubular element 13. The second retainer element 24 is placed opposite the first one adjacent end 15 of tubular element 13 and is capable of being displaced on element 13 axially as well as angularly. The two retainer elements 23 and 24 each have a tapered inner surface, 25 and 26, respectively, for contacting a correspondingly tapered part of a foot 27 of reel 14. Two nuts 30 and 31 having knurled outer surfaces, are threaded on an extension of threads 16.

To lock the reel holder on rod 10, it is sufficient, when the reel holder is correctly positioned axially and angularly on rod 10, to partially unscrew nut 17 in the direction of arrow 32, which simultaneously produces an axial displacement, in the direction of arrow 33, of the second end 22 of tubular element 13 and, in the direction of arrow 34, of tapered surface 19 of nut 17. End 22 and surface 19 come in contact with the tapered surfaces 9 and 8, respectively, to produce the tightening of each end, 3 and 2 respectively, of the first tubular element 1 on rod 10.

To lock reel 14 on the second tubular element 13, it is sufficient to first position within the retainer elements 23 and 24 the tapered ends of the reel foot 27, by moving the movable retainer element 24 in the direction of arrow 33 until tapered surface 25 and 26 bear against the tapered parts of foot 27. It is then only necessary to lock nut 30 against retainer element 24 and then lock nut 31 against nut 30.

It is, therefore, possible to disconnect and reconnect reel 14 on the reel holder at will, without disturbing the position of the reel holder on rod 10.

FIG. 2 illustrates a second embodiment of the present invention in which flange 7 does not have a tapered surface 9. Instead, the second end 22 of second tubular element 13 is formed with a tapered surface 35 designed to work with flange 7. It will be apparent that is also within the scope of this invention that tapered surfaces 9 and 35 could be simultaneously provided to work together. In addition, the second tubular element 13 contains, at its second end 22, an element 36 which is integral with it. This element 36 may, for example, be a lug obtained by stamping the second end 22 and has dimensions just sufficient to extend into and slide along one of the slots 5 of the first tubular element 1. All of the other elements in this embodiment are identical to those of the first embodiment.

The operation of the second embodiment is similar to that of the first embodiment as previously described. This embodiment makes it possible to improve the rotation locking of the second tubular element 13, to which reel 14 is fastenend, with respect to the first tubular element 1, which is in contact with rod 10, at both its ends and along its entire inner periphery.

What is claimed is:

1. A reel holder for a fishing rod comprising a first tubular element slidable on a fishing rod, said first tubular element being formed at each end with at least one lengthwise slot and a raised annular flange split by the lengthwise slot, a second tubular element slidably mounted around said first tubular element between the raised flanges, said second tubular element supporting means for locking a fishing reel to the reel holder and having a threaded end and an opposite end, a nut, positioned on the threaded end, having one end extendable beyond said threaded end, wherein at least one of the one end of said nut and the adjacent raised flange and at least one of the opposite end of said second tubular element and the adjacent raised flange have tapered surfaces so inclined that when the reel holder is positioned on a rod and said nut is partially unscrewed, the one end of said nut and the opposite end of said second tubular element bear against the raised flanges to simultaneously tighten each end of said first tubular element on the rod.

2. A reel holder according to claim 1, further comprising means for preventing relative rotation between said first and second tubular elements.

3. A reel holder according to claim 2, wherein said rotation preventing means includes a projection formed on the inner surface of said second tubular element shaped to extend into and slide along one of the lengthwise slots in said first tubular element.

4. A reel holder according to claim 1, wherein each of said raised flanges has a surface which tapers inwardly toward the other tapered surface.

5. A reel holder according to claim 4, wherein the one end of said nut is recessed and has a tapered internal surface which mates with the tapered surface of the adjacent raised flange.

6. A reel holder according to claim 1, wherein the opposite end of said second tubular element defines a surface which tapers inwardly toward the threaded end.

7. A reel holder according to claim 1, wherein said reel locking means includes a first reel retainer fixedly mounted to the outer surface of said second tubular element, a second reel retainer movable along the outer surface of said second tubular element and at least one lock nut threaded on an extension of the threaded end of said second tubular element.

8. A reel holder according to claim 1, wherein each end of said first tubular element includes a plurality of lengthwise slots.

* * * * *